(12) United States Patent
Moon et al.

(10) Patent No.: US 6,421,039 B1
(45) Date of Patent: Jul. 16, 2002

(54) LIQUID CRYSTAL DISPLAY IN-PLANE STRUCTURE AND METHOD OF MANUFACTURING THE SAME

(75) Inventors: Beom Jin Moon; Yong Min Ha, both of Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/010,138

(22) Filed: Jan. 21, 1998

(30) Foreign Application Priority Data

Jan. 22, 1997 (KR) .............................................. 97-1797

(51) Int. Cl.[7] ................................................ G09G 3/36
(52) U.S. Cl. ............................ 345/100; 345/96; 345/98
(58) Field of Search ............................. 327/269; 345/96, 345/100; 359/55

(56) References Cited

U.S. PATENT DOCUMENTS

| | | | | |
|---|---|---|---|---|
| 5,253,091 A | * | 10/1993 | Kimura et al. ................. | 359/55 |
| 5,489,867 A | * | 2/1996 | Tamanoi ..................... | 327/269 |
| 5,748,165 A | * | 5/1998 | Kubota et al. ................. | 345/96 |
| 5,886,679 A | * | 3/1999 | Matsuda et al. ............... | 345/96 |
| 5,926,161 A | * | 7/1999 | Furuhashi et al. ........... | 345/100 |

* cited by examiner

Primary Examiner—Steven Saras
Assistant Examiner—Srilakshmi K. Kumar
(74) Attorney, Agent, or Firm—Morgan, Lewis & Bockius LLP

(57) ABSTRACT

A liquid crystal display device includes a substrate, a plurality of scan lines on the substrate, a plurality of data lines crossing the plurality of scan lines on the substrate, a plurality of pixel electrodes, each of the plurality of pixel electrodes formed near the crossing of a respective data line and a scan lines, a plurality of thin film transistors, wherein each of the plurality of thin film transistors includes a gate electrode connected to a corresponding scan line, a source electrode connected to a corresponding data line, and a drain electrode connected to a corresponding pixel electrode, a plurality of common electrodes each located near the corresponding pixel electrode, and a plurality of common lines connecting the corresponding common electrodes, wherein the plurality of common lines are parallel to the plurality of data lines.

5 Claims, 15 Drawing Sheets

FIG.13
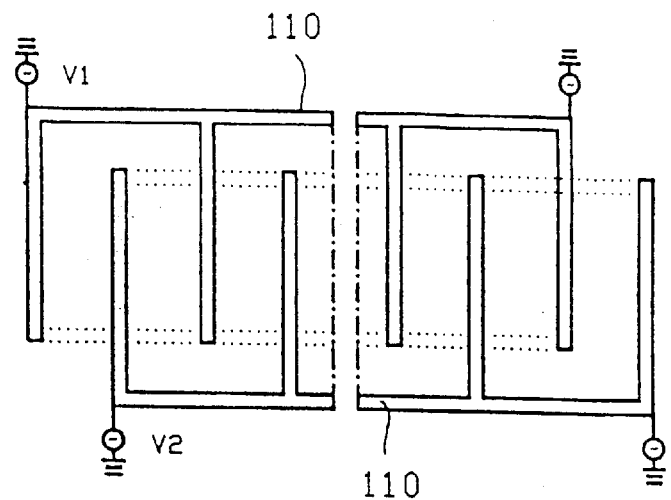
FIG.14A
FIG.14B
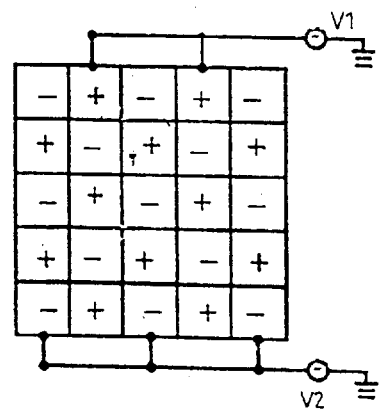

LIQUID CRYSTAL DISPLAY IN-PLANE STRUCTURE AND METHOD OF MANUFACTURING THE SAME

This application claims the benefit of Korean patent application No. 97-1797, filed Jan. 22, 1997, which is hereby incorporated by reference.

BACKGROUND OF THE INVENTION

1. Field of the Invention

The present invention relates to a liquid crystal display (LCD) device having an in-plane structure (IPS) where a common electrode is formed parallel to a data line in the same plane, and more particularly, to a driving method where AC voltage is applied to the common electrode of an LCD with an IPS.

2. Discussion of the Related Art

A cathode ray tube (CRT) is the most widely used display device in television sets or computer monitors, because the CRT can easily reproduce the color and has a high response speed. However, the CRT is too large, too heavy, and requires too much power for portable applications. In order to overcome these disadvantages of the CRT, a great deal of research and development has been conducted into other types of displays. Among them, a liquid crystal display (LCD) is one of the most commonly used devices.

The LCD can be used as a thin television set mounted on a wall, because the LCD does not have an electron gun, unlike the CRT. Furthermore, the LCD can be used as a portable display device in a notebook computer, because the LCD's power consumption is very low, and it can be driven by a battery.

In general, the LCD includes a liquid crystal panel 12 displaying the video data, and driver IC's 10 and 11 for controlling video data, as shown in FIG. 1. The liquid crystal panel 12 includes, as shown in FIG. 2, a first substrate 25, a second substrate 21, and a liquid crystal layer 24 injected between the first substrate 25 and second substrate 21. The first substrate 25 includes a plurality of scan lines 14 and a plurality of data lines 15, with the scan lines 14 and the data lines 15 arrayed in a matrix. The first substrate 25 also includes a pixel electrode 26 (see FIG. 2) and a thin film transistor (TFT) 13, formed at crossing locations of the scan lines and data lines. Both the second substrate 21 and the first substrate 25 include a common electrode 23 and a color filter layer 22. The pixel electrode 26 and the common electrode 23, which face each other, and which have the liquid crystal between them, act as a pixel 16 shown in FIG. 1. The liquid crystal panel also includes a polarization plate 20 on outer sides of the first substrate 25 and the second substrate 21.

The TFT includes a gate electrode 30 (which is usually made of chromium), a source electrode 32, and a drain electrode 33 made of a transparent conductive material such as indium tin oxide, a semiconductor layer 34, and a doped semiconductor layer 36. The gate electrode 30 is connected to the scan line 14, and the source electrode 32 is connected to the data line 15. The drain electrode 33 is connected to the pixel electrode 26. The TFT works as a switch, which passes a data voltage applied to the data line 15 to the drain electrode 33 when a scan voltage is applied to the gate electrode 30 through the scan line 14. If the data voltage is applied to the drain electrode 33, then it is applied to the pixel electrode 26 connected to the drain electrode 33. Thus, an electric field exists due to a voltage difference between the pixel electrode 26 and the common electrode 23. The orientation of the liquid crystal molecules between the pixel electrode 26 and the common electrodes 23 rotate in response to the electric field. Thus, the amount of light transmitted at the pixel changes. That is, there is a difference in light transmittance between the pixel having a data voltage applied to it and the pixel without the data voltage applied. By using the pixels having the difference in transmittance, the LCD functions as a display device.

In this structure of the LCD, as shown in FIG. 2, the liquid crystal molecules rotate their orientation in a plane parallel to the orientation of the substrates. Therefore, a transmittance is highest in the tangential direction of the panel. However, the transmittance decreases as the viewing angle from the tangential direction increases. Thus, increasing the viewing angle is a very difficult problem for this LCD structure.

An in-plane structure (IPS) is one solution for increasing the viewing angle. In the IPS, as illustrated in FIG. 4a showing a plan view, a common electrode 23 of the pixel is parallel to a pixel electrode 26 and has a segment shape parallel to a data line 15. The bus lines for connecting the common electrodes 23 and the common lines 27 are parallel to the scan line 14. Referring to FIG. 4b showing the cross-sectional view of an LCD with IPS, the LCD includes a TFT having a gate electrode 30, a source electrode 32 and a drain electrode 33, the pixel electrode 26, and the common electrode 23 on the same substrate 25. The working principle of an LCD with IPS is the same that of a non-IPS LCD. However, the direction of an electric field is different from a non-IPS LCD. As shown in FIG. 5, the arrangement of the liquid crystal molecules 24 is parallel to the substrate, because the electric field is formed parallel to the substrate surface. Therefore, the liquid crystal molecules cut off the light or pass the light independent of the viewing angle.

Generally, driving methods for an LCD include line inversion, column inversion, or dot inversion. In the line inversion method, as shown in FIGS. 6a–6b, a polarity of a voltage applied to the pixel electrodes is reversed in every scan line. In the column inversion method, as shown in FIGS. 7a–7b, the polarity of the voltage applied to the pixel electrodes is reversed in every data line. In the dot inversion method, as shown in FIGS. 8a–8b, the polarity of the voltage is reversed for every row and column, that is, for every scan and data line.

In the line or column inversion method, a flicker problem is common. The reason is that when a scan line signal is high, all TFT's connected to the scan line are turned on, and the data signals are sent to the pixel electrodes from the source electrodes, which are connected to the data lines. Then, the liquid crystal molecules are driven by the voltage difference between the pixel electrode and the common electrode. When the scan line signal is low, all TFT's connected to the scan line are turned off. When that happens, the voltage applied to the pixel electrodes 26 remains on the pixel electrodes 26, the liquid crystal molecules remain in the same state of rotation, and display signals are maintained. However, the stored signal voltage in the pixel electrode is reduced somewhat ($\Delta V$) by the coupling capacitance (Cgs) formed between the scan lines and data lines. Thus, the liquid crystal display flickers because the voltages on the pixel electrodes 26 are not all the same.

In the dot inversion method the flicker problem does not occur because neighboring pixels have different signal values. As shown in FIGS. 8a–8b, if a positive signal is applied to a first pixel, a second pixel, which is a neighboring pixel, has a negative signal applied to it. At the next cycle, the first pixel has a negative signal and the second pixel has a positive signal applied to it. That is, the pixel signal has a pulse signal type, as shown in FIG. 9. The voltage differences (ΔV), which occur in positive and negative states, can be moderated by control of the common voltage. Therefore, the voltage differences are the same, and the flicker problem can be solved.

In the dot inversion method, the voltage applied to the common electrode is a DC voltage, in general. On the other hand, to solve the flicker problem, the voltage difference should be maintained the same when the signal applied to the pixel electrode is AC. Thus, the power consumption of the dot inversion method is large, because the common voltage is a DC voltage. For example, if the voltage difference is 2.5V, and the common voltage is +2.5V, then the signal voltage applied to the pixel electrodes 26 is an AC voltage in the range from 5V to 0V. Therefore, in order to reduce the power consumption, the swing range of the voltage applied to the pixel electrode 26 should be reduced. If the common voltage is an AC voltage in the range between +1.25V and −1.25V, and is 180 degrees out of phase with the signal voltage, then the signal voltage between +1.25V and −1.25V is sufficient to maintain the 2.5V voltage difference. The method for applying an AC voltage to the common electrode 23 is known in the art. In this method, the common electrode is a patterned line parallel to the data lines.

SUMMARY OF THE INVENTION

Accordingly, the present invention is directed to a liquid crystal display in-plane structure and method of manufacturing the same that substantially obviates one or more of the problems due to the limitations and disadvantages of the related art.

An object of the present invention is to provide an IPS structure of an LCD that can be driven in an AC mode.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in one aspect of the present invention there is provided a liquid crystal display device, including a substrate, a plurality of scan lines on the substrate, a plurality of data lines crossing the plurality of scan lines on the substrate, a plurality of pixel electrodes, each of the plurality of pixel electrodes formed near the crossing of a respective data line and a scan lines, a plurality of thin film transistors, wherein each of the plurality of thin film transistors includes a gate electrode connected to a corresponding scan line, a source electrode connected to a corresponding data line, and a drain electrode connected to a corresponding pixel electrode, a plurality of common electrodes each located near the corresponding pixel electrode, and a plurality of common lines connecting the corresponding common electrodes, wherein the plurality of common lines are parallel to the plurality of data lines.

In another aspect of the present invention there is provided a method of driving a liquid crystal display device with an in-plane structure mode, including the steps of sequentially applying a scan signal to a plurality of scan lines, applying a first data signal to a plurality of odd data lines, applying a second data signal having reversed polarity relative to the first data signal to a plurality of even data lines, applying a first common signal to a plurality of odd common lines, wherein the plurality of odd common lines are parallel to the odd data lines, and applying a second common signal to a plurality of even common lines, wherein the plurality of even common lines are parallel to the plurality of even data lines.

In another aspect of the present invention there is provided a method of forming a liquid crystal display device, including the steps of forming a scan line, a gate electrode, and a common electrode in a first layer on a substrate, forming a gate insulation layer over the scan line, the gate electrode, the pixel electrode and the substrate, forming a source electrode, a drain electrode, a data line, a common line, and a pixel electrode in a second layer, wherein the common line connects to the common electrode, and the data line connects to the source electrode, and forming a semiconductor layer over the gate electrode and the gate insulation layer.

In another aspect of the present invention there is provided a method of forming a liquid crystal display device, including the steps of forming a scan line, a gate electrode, and a pixel electrode in a first layer on a substrate, forming a gate insulation layer over the scan line, the gate electrode, the pixel electrode and the substrate, forming a source electrode, a drain electrode, a data line, a common line, and a common electrode in a second layer, wherein the drain electrode connects to the pixel electrode, and forming a semiconductor layer over the gate electrode and the gate insulation layer.

In another aspect of the present invention there is provided a method of forming a liquid crystal display device, including the steps of forming a scan line and a gate electrode in a first layer on a substrate, forming a gate insulation layer over the scan line, the gate electrode, and the substrate, forming a source electrode, a drain electrode, a common electrode, a common line, and a data line in a second layer and over the gate insulation layer, forming a semiconductor layer over the gate and the gate insulation layer, forming a protective layer over the semiconductor layer, the common electrode, the common line, the source electrode, the drain electrode, and the data line, and forming a pixel electrode in a third layer and over the protective layer, wherein the pixel electrode is selectively in contact with the drain electrode.

In another aspect of the present invention there is provided a method of forming a liquid crystal display device, including the steps of forming a scan line and a gate electrode in a first layer on a substrate, forming a gate insulation layer over the scan line, the gate electrode, and the substrate, forming a source electrode, a drain electrode, a data line, and a pixel electrode in a second layer over the gate insulation layer, forming a semiconductor layer over the gate electrode and the gate insulation layer, forming a protective layer over the source electrode, the drain electrode, the data line, and the pixel electrode, and forming a common electrode and a common line in a third layer over the protective layer.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIGS. 7a–7b show polarities of voltages applied to the pixels in a column inversion method;

FIG. 8 shows the polarities of voltages applied to the pixels in a dot inversion method;

FIG. 13 shows connecting wiring of common electrodes of the present invention;

FIGS. 14a–14b show waveforms of voltages applied to the pixel electrode and the common electrode in the dot inversion method of the present invention;

DETAILED DESCRIPTION OF THE PREFERRED EMBODIMENTS

Reference will now be made in detail to the preferred embodiments of the present invention, examples of which are illustrated in the accompanying drawings.

The present invention includes an LCD with an IPS mode having common electrodes located near pixels, and a plurality of common lines connected to common electrodes, where the common lines are parallel to data lines. The common lines have an AC common voltage applied to them. In particular, odd common lines have an AC common voltage which has a phase difference of 180 degrees relative to an AC common voltage on the even common lines.

Figure 1:
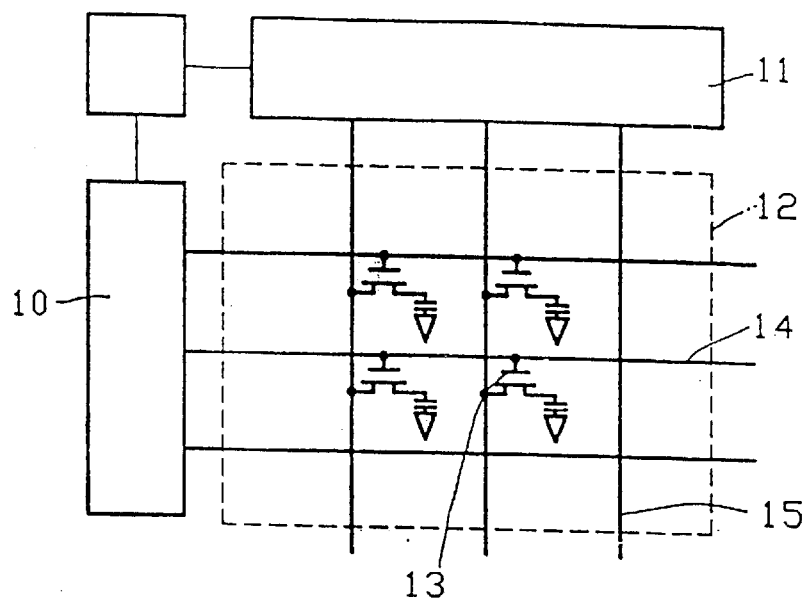
FIG. 1 shows a conventional structure of a liquid crystal display device including an active panel and a driver IC.
Figure 2:
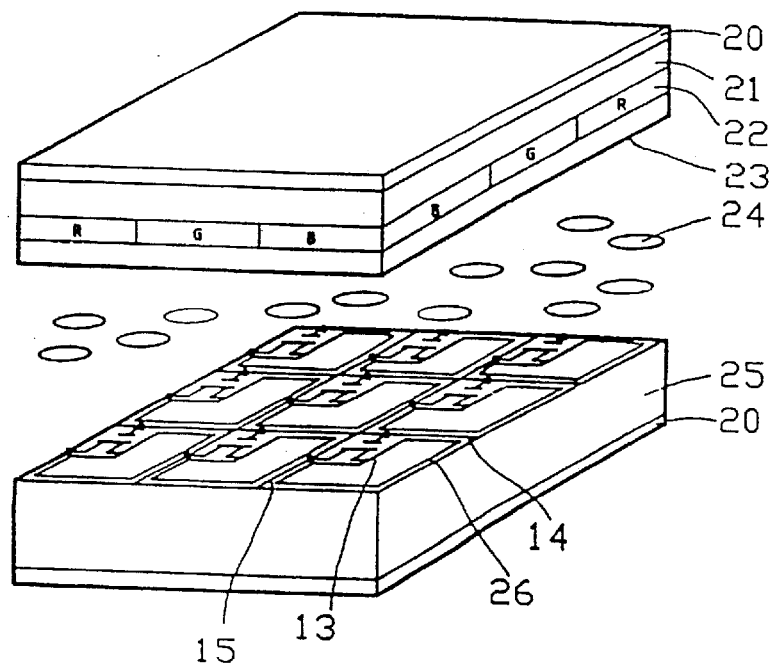
FIG. 2 is a cross-sectional view showing the conventional structure of the liquid crystal display device of FIG. 1.
Figure 3:
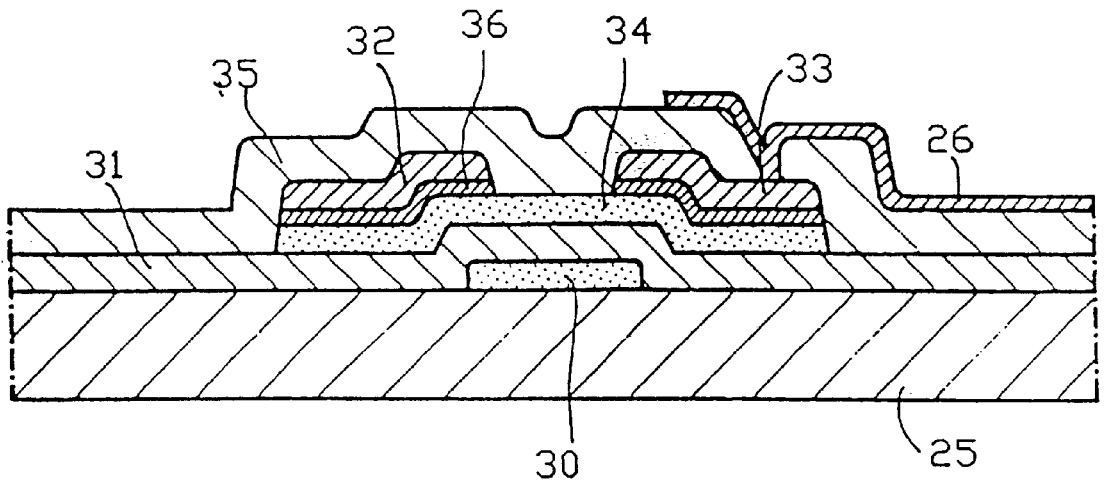
FIG. 3 is a cross-sectional view showing the conventional structure of a thin film transistor in the liquid crystal display device of FIG. 1.
Figure 4B:
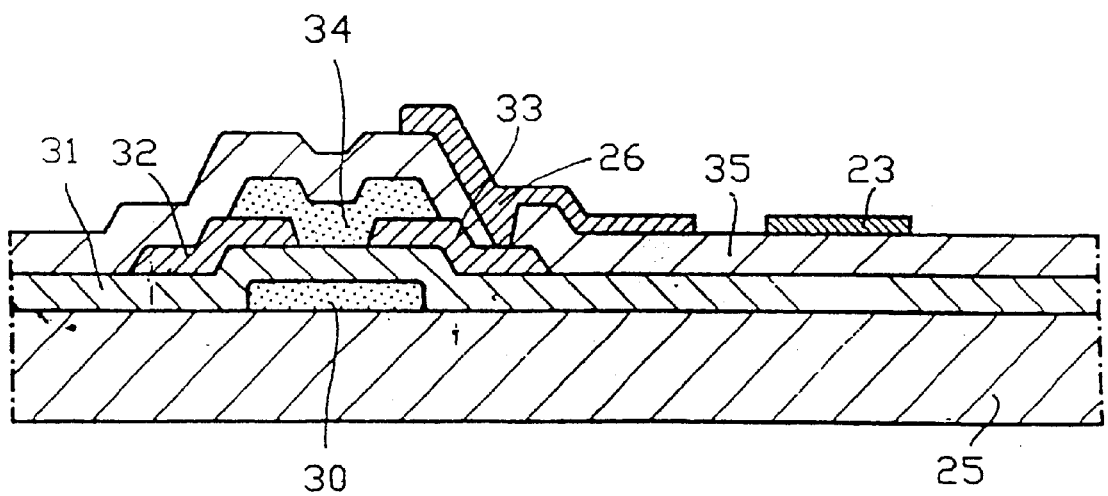
FIG. 4b is a cross-sectional view of FIG. 4a showing the conventional structure of an LCD with an in-plane structure mode.
Figure 4A:
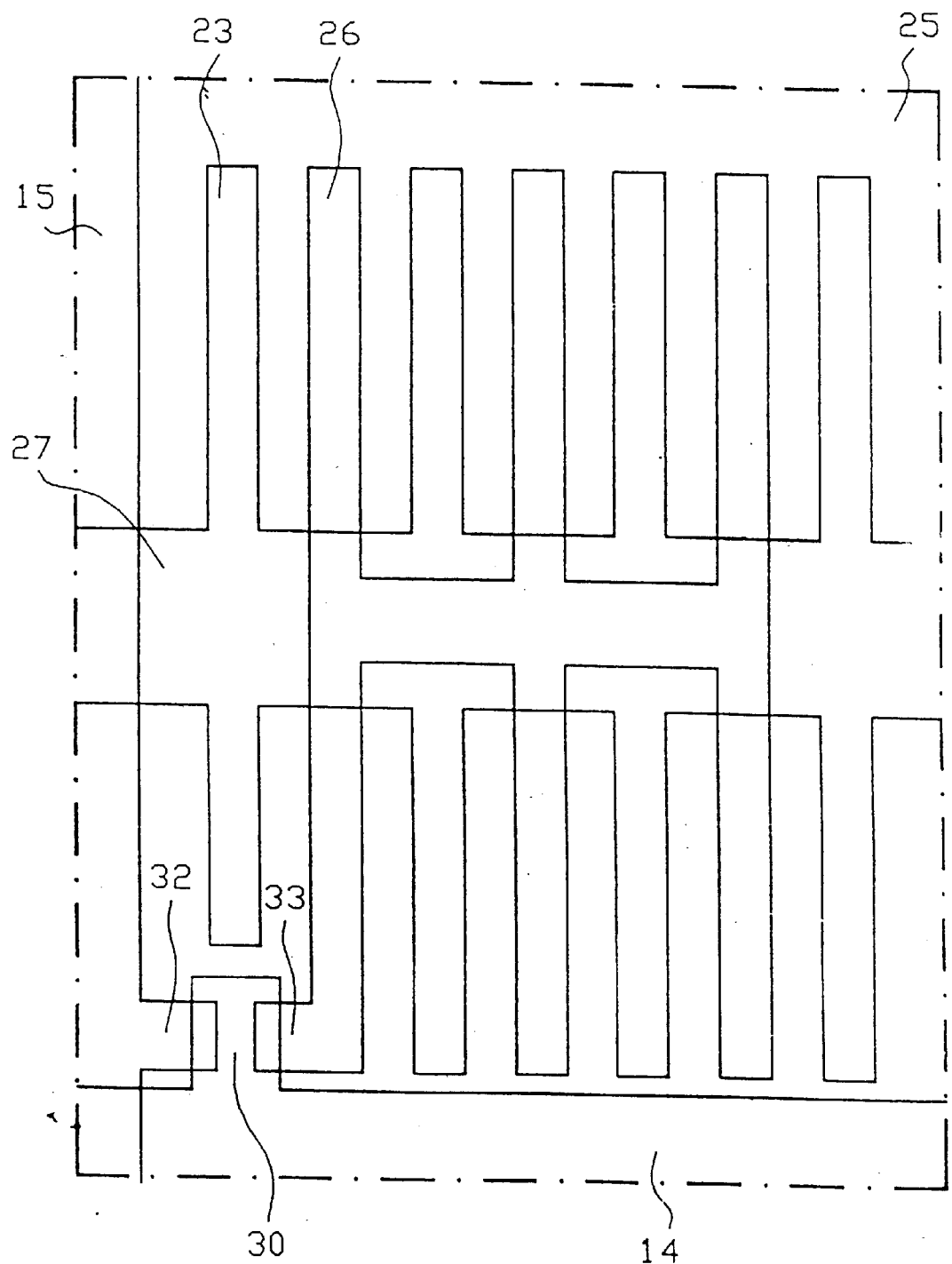
FIG. 4a is a plan view showing the conventional structure of an LCD with an in-plane structure mode.
Figures 5, 6A, 6B:
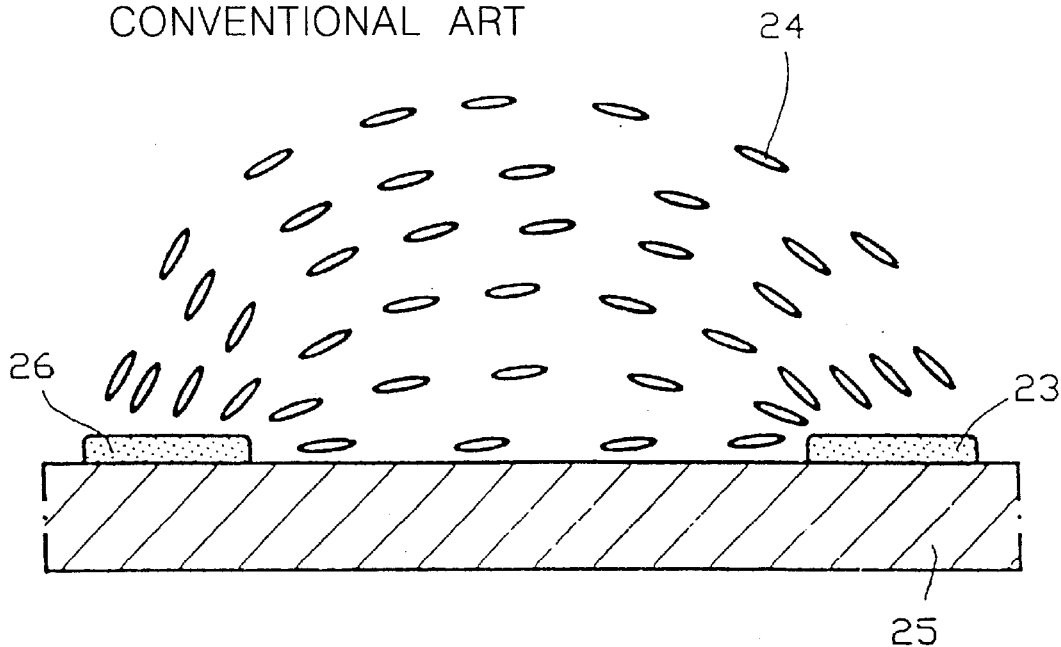
FIG. 5 shows an orientation of liquid crystal molecules in the in-plane structure mode.
FIGS. 6a–6b show polarities of voltages applied to pixels in a line inversion method.
Figure 9:
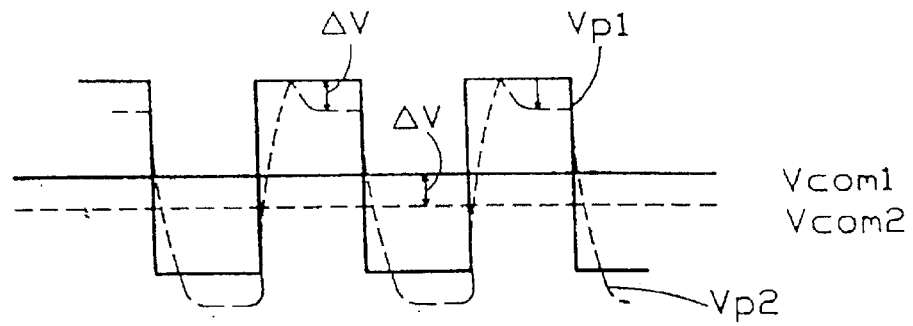
FIG. 9 shows waveforms of voltages applied to a pixel electrode and a common electrode of one pixel in the dot inversion method.
Figure 10:
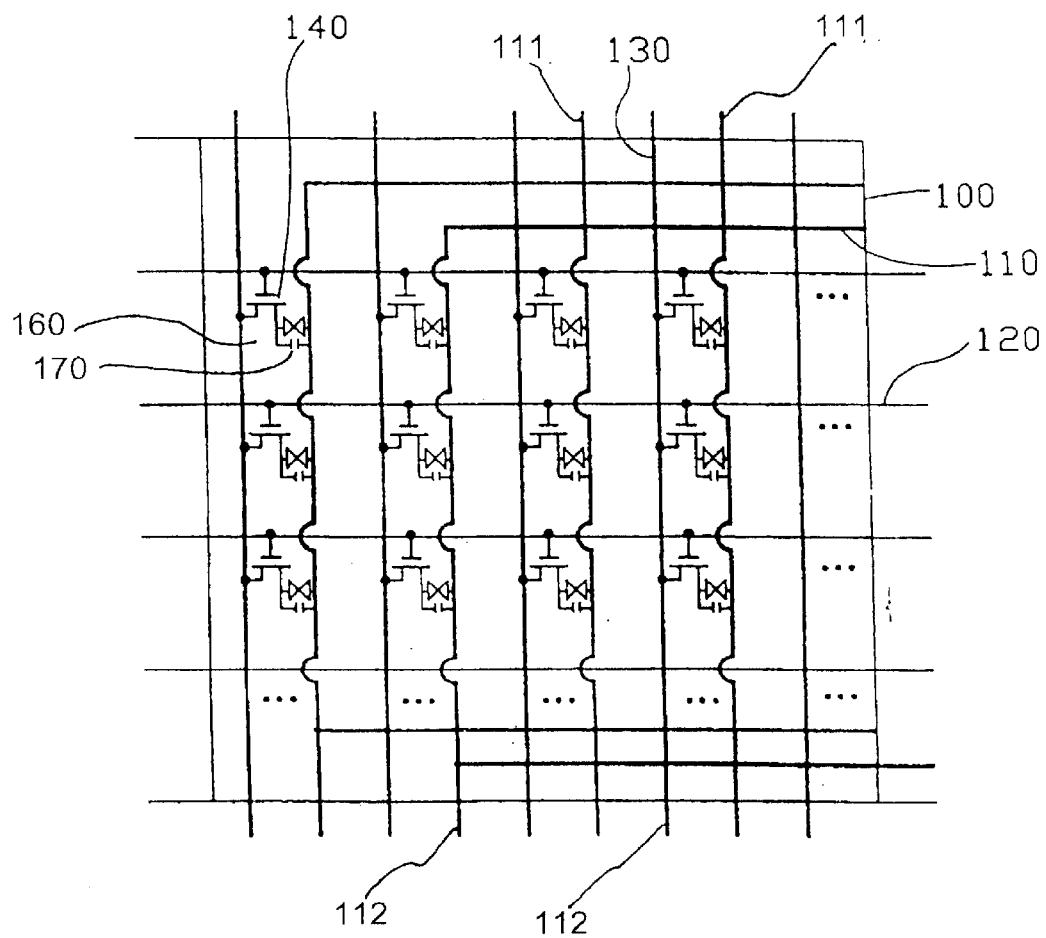
FIG. 10 is a plan view showing a structure of an LCD with in-plane structure mode of the present invention.

The structure of the LCD with the IPS mode of the present invention is shown in FIG. 10. An active panel 100 of the LCD of the present invention includes a plurality of scan lines 120, a plurality of data lines 130, a first common line 111, a second common line 112, a plurality of pixels 160 located near neighboring scan and data lines, a plurality of thin film transistors 140 each located at a corner of the pixel 160, and a storage capacitor 170. The first common line 111 and the second common line 112 have an applied common voltage synchronized with a data signal because they are parallel to the data lines 130.

Figure 11:
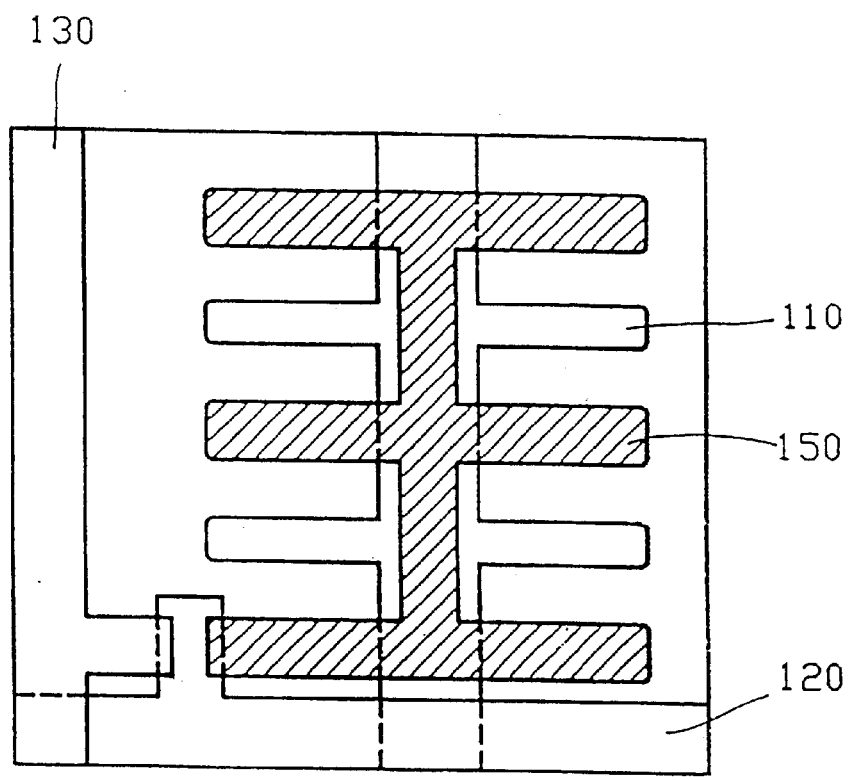
FIG. 11 shows a structure of a pixel of the present invention.
Figure 12:
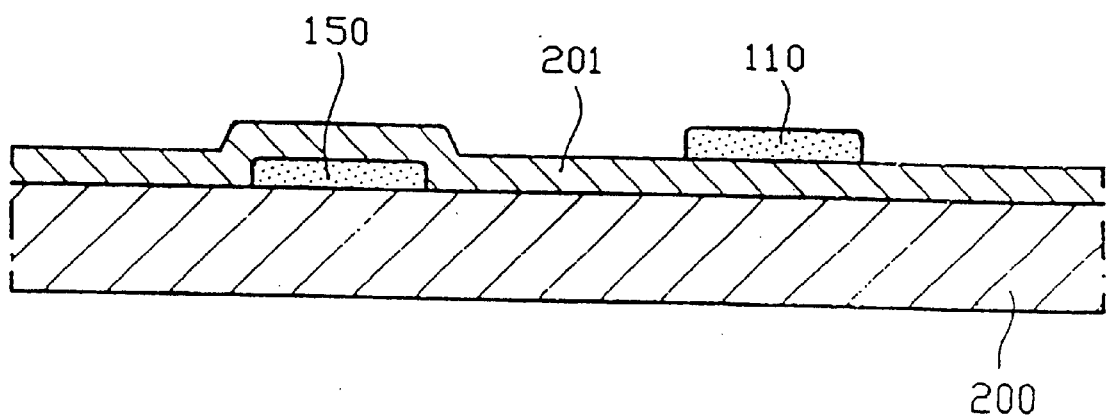
FIG. 12 is a cross-sectional view showing a structure of the pixel of the present invention.

A structure of the pixel 160 is shown in FIG. 11, and a cross-sectional view of the pixel 160 is shown in FIG. 12. A common electrode 110 is formed on a substrate 200 of an active panel and a pixel electrode 150 is formed near the common electrode 110. The common electrode 110 is connected to either the first common line 111 or the second common line 112.

The LCD works as a display device when liquid crystal molecules are driven by an electric field that exists due to a difference in voltage between the common electrode 110 and the pixel electrode 150. The direction of the electric field is parallel to the surface of the substrate. Additionally, the phase difference of the common voltage and the pixel electrode voltage is 180 degrees, but the cycle rate of these two voltages is the same. Thus, when a positive voltage is applied to the pixel electrode 150, a negative voltage is applied to the common electrode 110, and vice versa.

FIG. 13 shows the structure of the first common line 111 and the second common line 112 of the present invention. The first common line 111 connects the common electrodes in odd columns, and a first common voltage (V1) is applied to the first common line 111. The second common line 112 connects the common electrodes 110 in even columns, and a second common voltage (V2) is applied to the second common line 112.

Figure 15A:
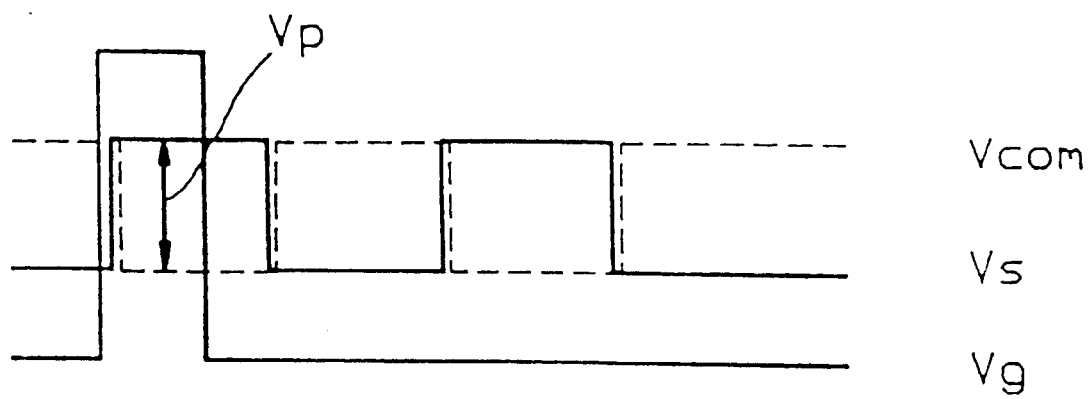
FIGS. 15a–15b show waveforms of a scan signal, a data signal, and a common signal.
Figure 15B:
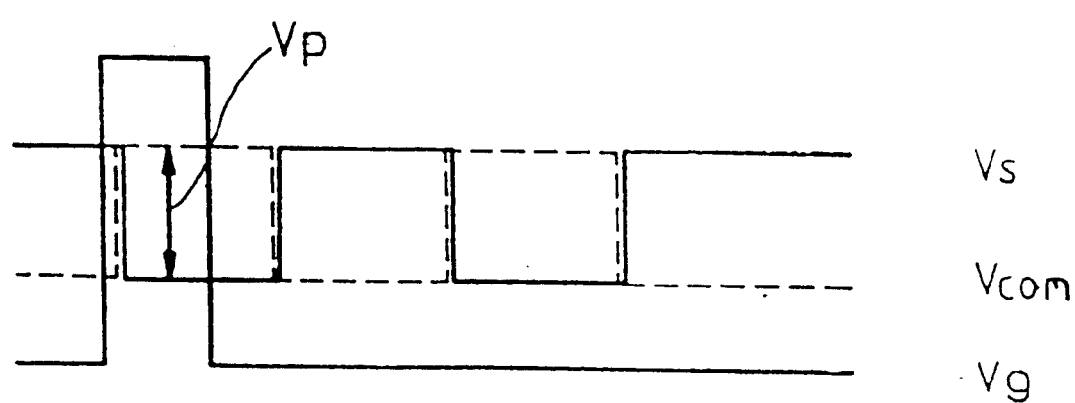

FIGS. 14a–14b show examples of phases of the common voltages. FIGS. 15a–15b show waveforms of a scan voltage (Vg), a data voltage (Vs), and a common voltage (Vcom). The phases of the first common voltage and the first data voltage of the odd column are reversed compared to those of the second common voltage and the second data voltage of the even column.

Consequently, the present invention provides an LCD active panel including scan lines on a substrate, data lines crossing the scan lines and perpendicular to them, pixel electrodes located in an area surrounded by the neighboring scan and data lines, all arranged in a matrix pattern, thin film transistors including gate electrodes connected to the scan lines, source electrodes connected to the data lines, and drain electrodes connected to the pixel electrodes, common electrodes located near the pixel electrodes, and common lines connected to the common electrodes arranged in columns parallel to the data lines. Additionally, the common lines include a first set of common lines connected to the common electrodes arrayed in odd columns, and a second set common lines connected to the common electrodes arrayed in even columns. The active panel further includes a first common voltage supply applying an AC voltage to the first common line, and a second common voltage supply applying an AC voltage to the second common line. The active panel can be manufactured in many variations depending on how the common electrode and pixel electrode are arranged.

First Preferred Embodiment

Figure 16:
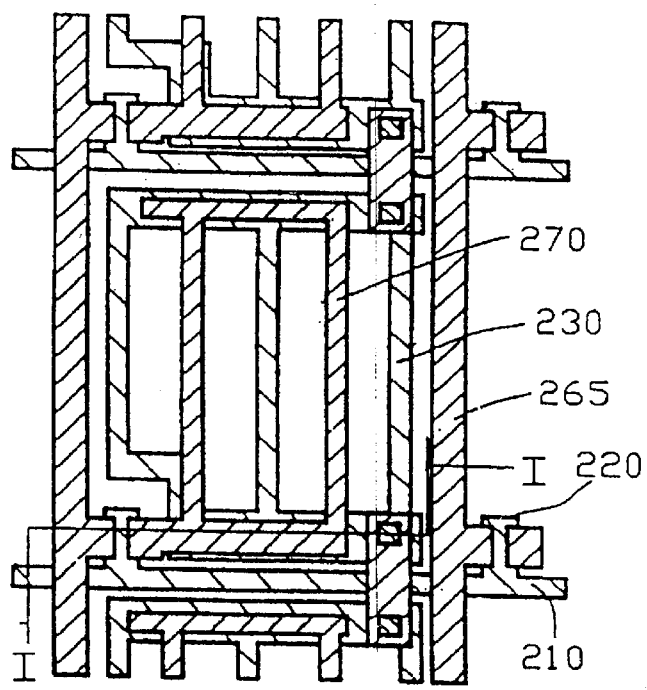
FIG. 16 shows a first embodiment of a structure of the pixel of present invention.

As shown in FIG. 16, a common electrode 230 is made of the same material and positioned in the same layer as a gate electrode 220 and a scan line 210. A common line 290 is made of the same material and positioned in the same layer as a data line 265.

Figure 17A:
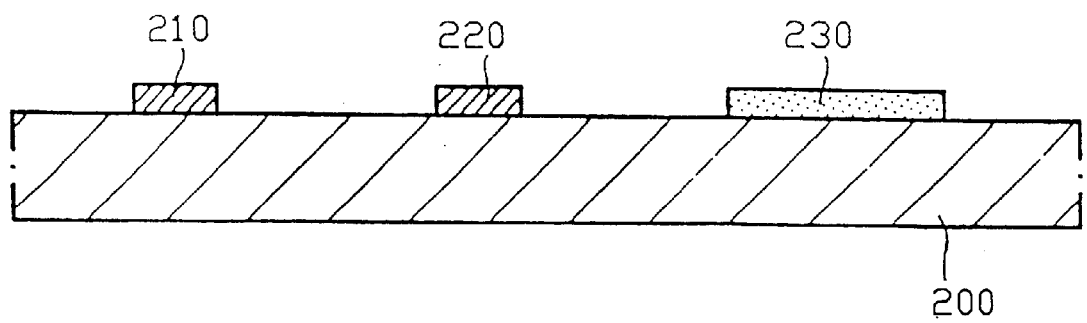
FIGS. 17a–17c show the first embodiment of a manufacturing process for a thin film transistor and a pixel electrode of the present invention across line I—I of FIG. 16.
Figure 17B:
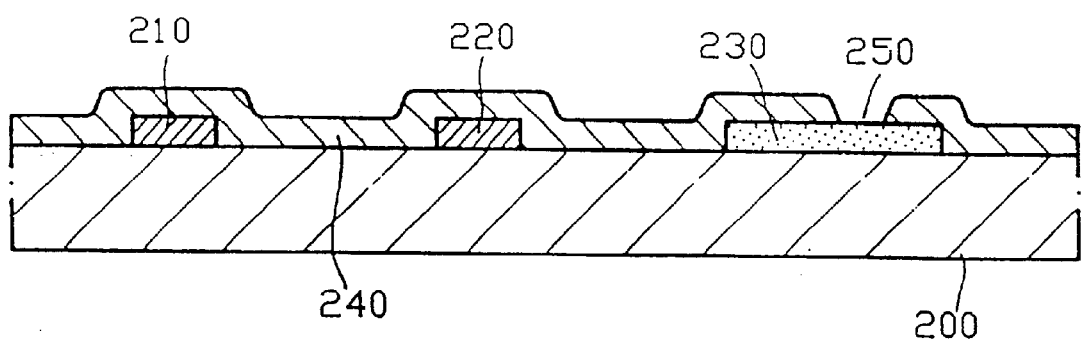
Figure 17C:
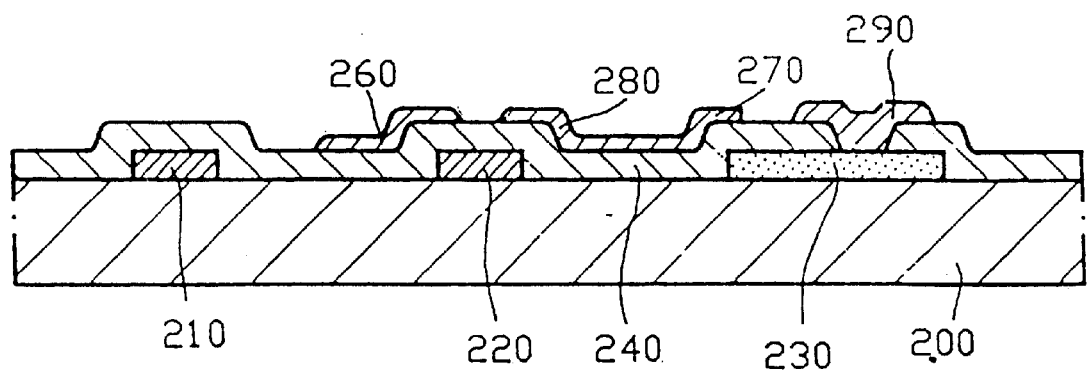

Referring to FIGS. 17a–17c showing a cross-section across line I—I of FIG. 16, the manufacturing method is as follows: The gate electrode 220, the scan line 210 connected to the gate electrode 220, and the common electrode 230 are formed on a substrate 200 using a metal including aluminum or an aluminum alloy, as shown in FIG. 17a. A gate insulation layer 240 is deposited over the substrate, the gate electrode 220, the scan line 210, and the common electrode 230. A contact hole 250 is formed by patterning the gate insulation layer 240, as shown in FIG. 17b. A pixel electrode 270, a source electrode 260, a drain electrode 280, a data line 265, and a common line 290 are formed on the gate insulation layer 240 from a conductive material such as chromium or indium tin oxide. The data line 265 connects to the source electrode 260. The pixel electrode 270 and the common electrode 230 are arranged in an alternating pattern, and are parallel to the data line 265. A semiconductor layer (not shown in FIGS. 17a–17c), which functions as a channel region of a thin film transistor, is formed over the structure. A protective layer (not shown in FIGS. 17a–17c) is then formed over the entire structure.

Second Preferred Embodiment

Figure 18:
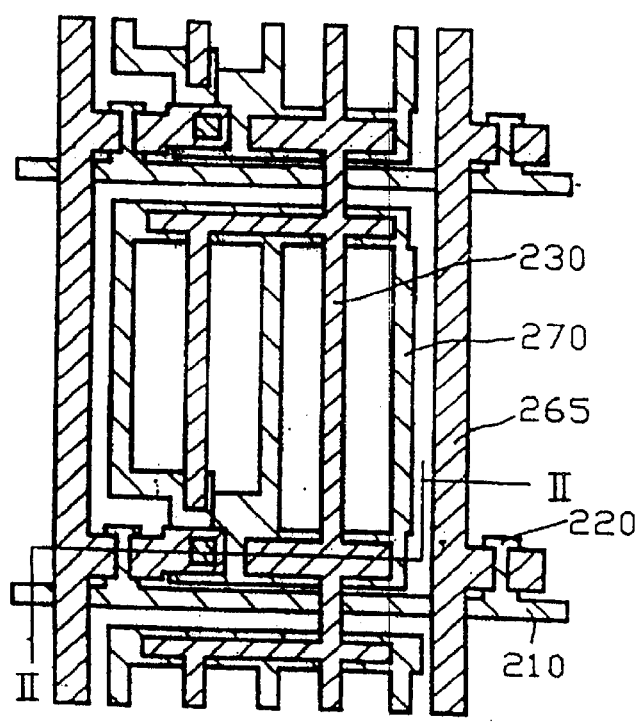
FIG. 18 shows a second embodiment of a structure of the pixel of the present invention.

As shown in FIG. 18, a common electrode 230 is made of the same material and in the same layer that includes a data line 265. A pixel electrode 270 is made of the same material and in the same layer that includes a scan line 210. A drain electrode 280 of a thin film transistor (TFT) is connected to the pixel electrode 270 through a contact hole 250.

Figure 19A:
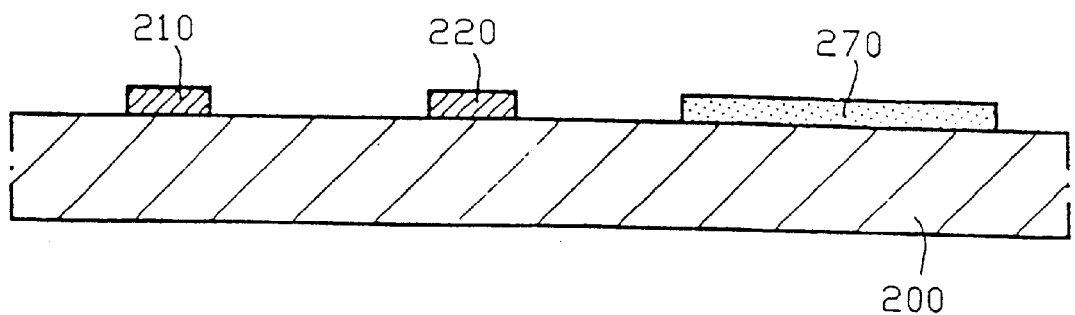
FIGS. 19a–19c show the second embodiment of a manufacturing process for a thin film transistor and a pixel electrode of the present invention across line II—II of FIG. 18.
Figure 19B:
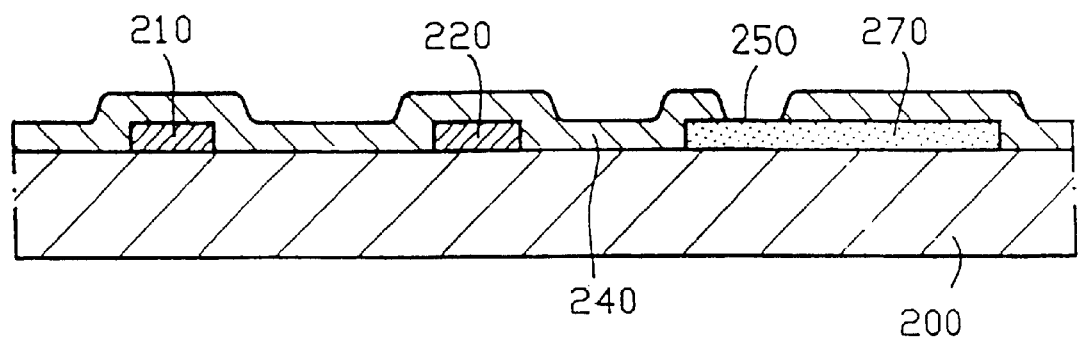
Figure 19C:
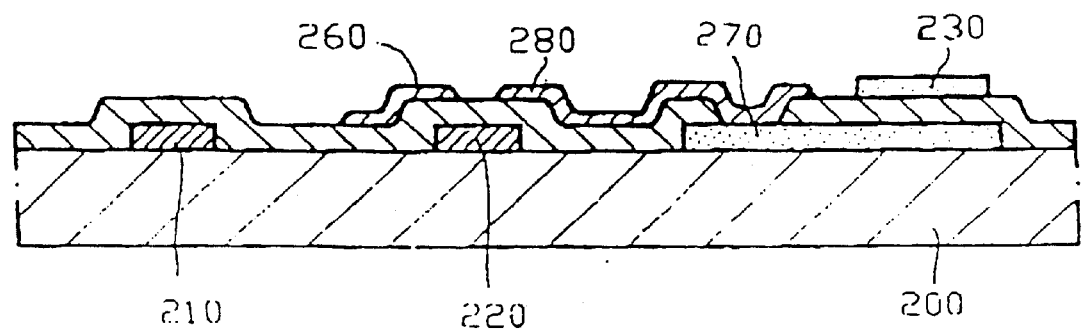

Referring to FIGS. 19a–19c showing a cross-section along line II—II of FIG. 16, the manufacturing method is as follows: A gate electrode 220, the scan line 210, and the pixel electrode 270 are formed on a substrate 200 using a metal such as aluminum or an aluminum alloy, as shown in FIG. 19a. A gate insulation layer 240 is deposited over the substrate 200, the gate electrode 270, the scan line 210, and the pixel electrode 270. A contact hole 250 is formed by patterning the gate insulation layer 240 over a portion of the pixel electrode 270, as shown in FIG. 19b. The data line 265, a source electrode 260, the drain electrode 280, and the common electrode 230 are formed over the gate insulation layer 240 from a conductive material such as chromium or indium tin oxide. The drain electrode 280 connects to the pixel electrode 270 through the contact hole 250, as shown in FIG. 19c. A semiconductor layer (not shown in FIGS. 19a–19c), which functions as a channel region of a thin film transistor, is formed over the structure. A protective layer (not shown in FIGS. 19a–19c) is formed over the entire structure.

Third Preferred Embodiment

Figure 20:
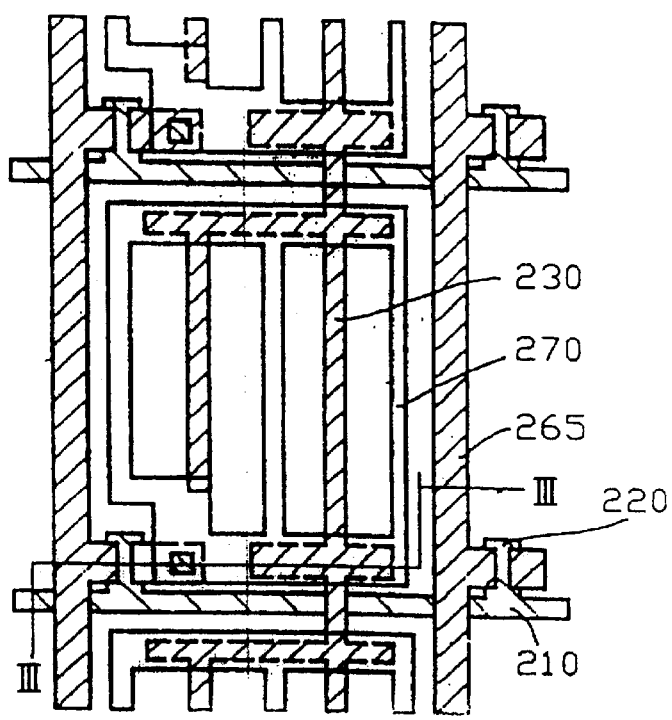
FIG. 20 shows a third embodiment of a structure of the pixel of the present invention.

As shown in FIG. 20, a common electrode 230 is made of the same material and in the same layer that includes a data line 265, but a pixel electrode 270 is made of a transparent conductive material on another layer that also includes a scan line 210.

Figure 21A:
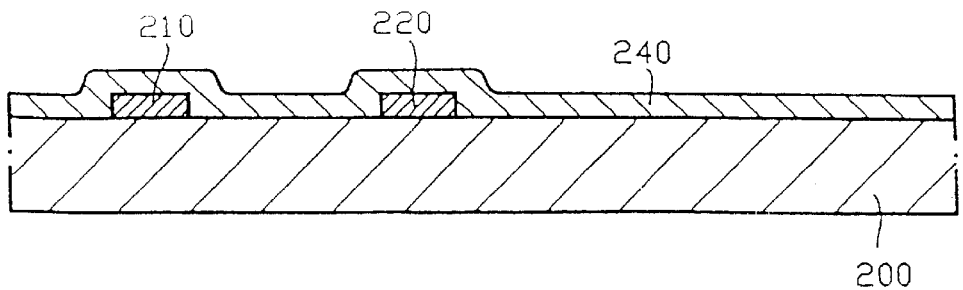
FIGS. 21a–21d show the third embodiment of a manufacturing process for a thin film transistor and a pixel electrode of the present invention across line III—III of FIG. 20.
Figure 21B:
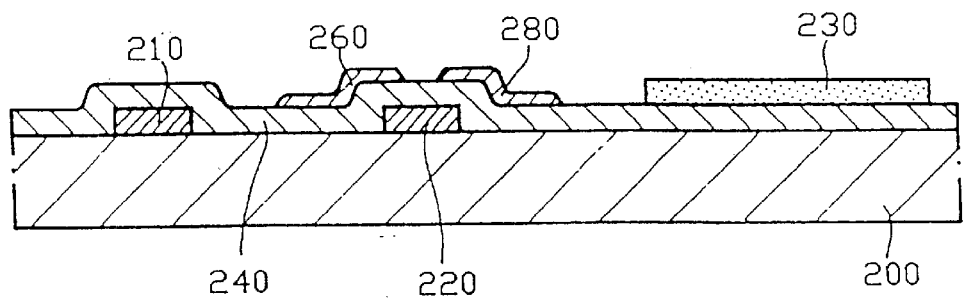
Figure 21C:
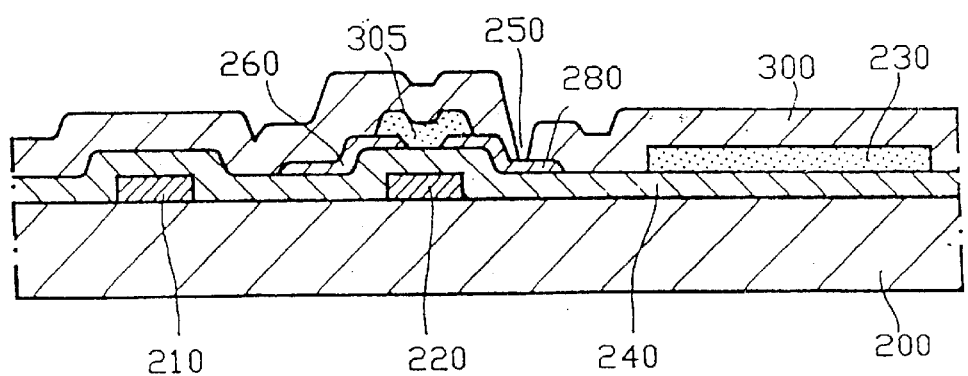
Figure 21D:
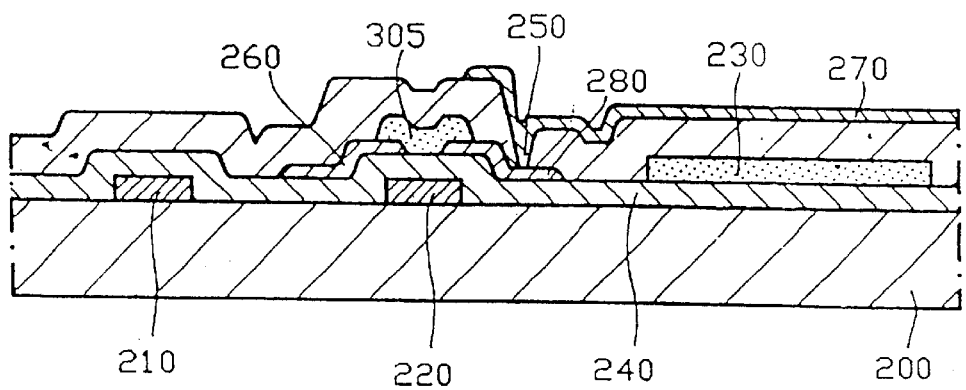

Referring to FIGS. 21a–21c showing a cross-section along line III–III of FIG. 20, the manufacturing method is as follows: A gate electrode 220 and the scan line 210 are formed on a substrate 200 using a metal such as an aluminum or an aluminum alloy. A gate insulation layer 240 is deposited over the substrate 200, including the gate electrode 220, and the scan line 210, as shown in FIG. 21a. A source electrode 260, a drain electrode 280, a data line 265, and a common electrode 230 are formed on the gate insulation layer 240 using a metal such as chromium or a chromium alloy, as shown in FIG. 21b. A semiconductor layer 305 is formed covering the source electrode 260 and the drain electrode 280. Here, the source electrode 260 is an ohmic contact with the semiconductor layer 305, as is the drain electrode 280. A protective layer 300 is deposited over the source electrode 260, the drain electrode 280, the semiconductor layer 305, and the common electrode 230. A contact hole 250 is formed by patterning the protective layer 300 over a portion of the drain electrode 280, as shown in FIG. 21c. The pixel electrode 270 is formed on the protective layer 300 from a transparent conductive material such as indium tin oxide. The pixel electrode 270 connects to the drain electrode 280 through the contact hole 250, as shown in FIG. 21d.

Fourth Preferred Embodiment

Figure 22:
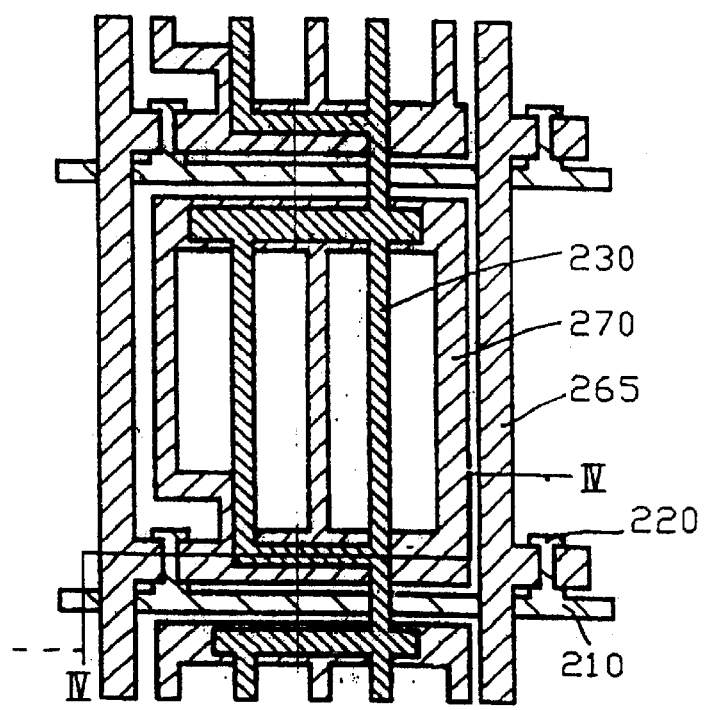
FIG. 22 shows a fourth embodiment of a structure of the pixel of the present invention.

As shown in FIG. 22, a pixel electrode 270 is made of the same material and in the same layer that includes a data line 265 (not shown in FIG. 22), and a common electrode 230 is formed on a separate layer over an insulation layer.

Figure 23A:
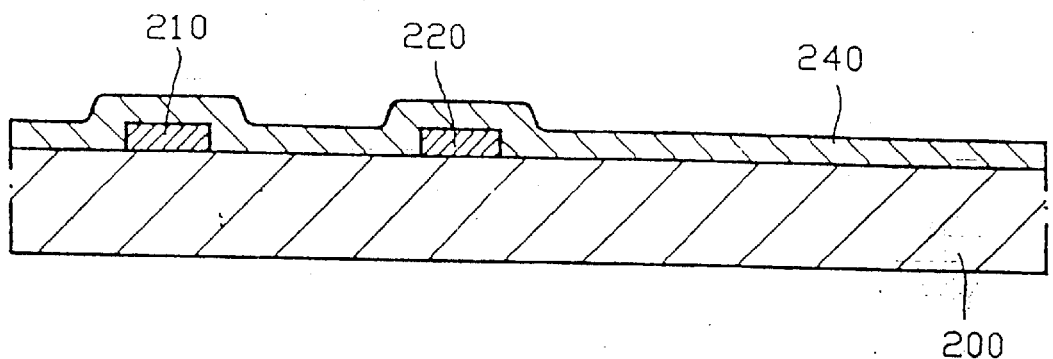
FIGS. 23a–23c show the fourth example of a manufacturing process for a thin film transistor and a pixel electrode of the present invention across line IV—IV of FIG. 22.
Figure 23B:
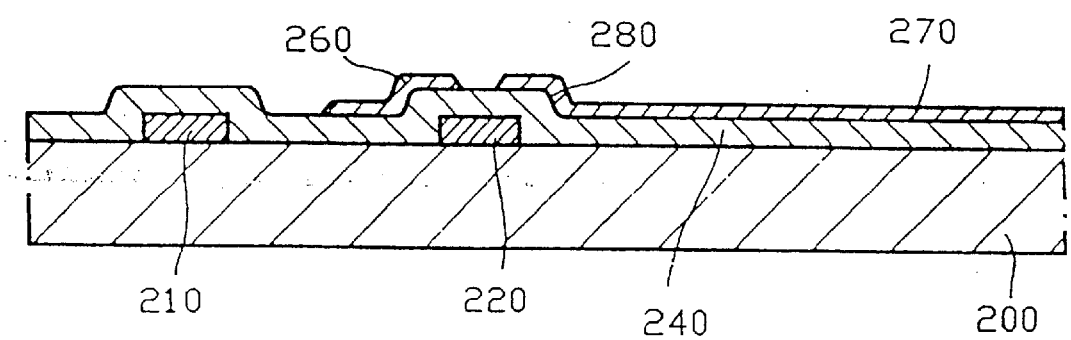
Figure 23C:
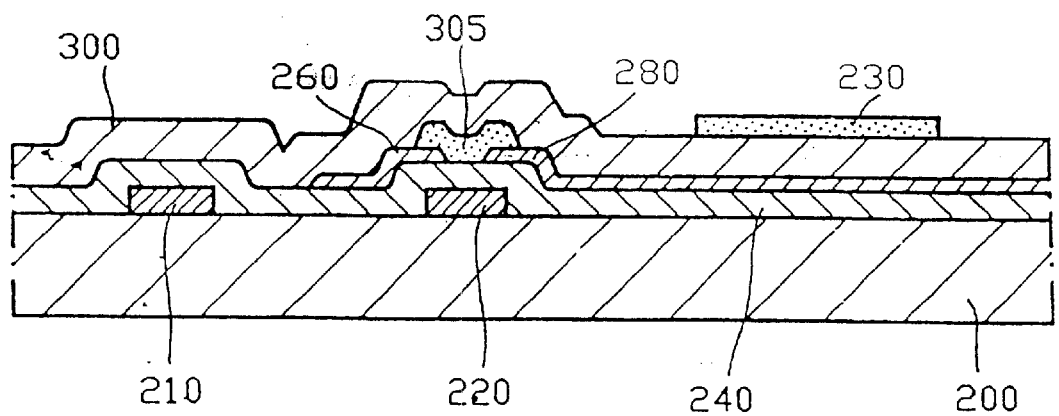

Referring to FIGS. 23a–23c showing a cross-section along line IV—IV of FIG. 22, a manufacturing method is as follows: A gate electrode 220 and a scan line 210 are formed on a substrate 200 using a metal such as aluminum or an aluminum alloy. A gate insulation layer 240 is deposited thereon, as shown in FIG. 23a. A source electrode 260, a drain electrode 280, and the pixel electrode 270 are formed on the gate insulation layer 240 using a conductive material such as chromium or indium tin oxide, as shown in FIG. 23b. A semiconductor layer 300 is formed over the source electrode 260 and the drain electrode 280. The source electrode 260 is an ohmic contact with the semiconductor layer 305, as is the drain electrode 280. A protective layer 300 is deposited over the substrate 200, the source electrode 260, the drain electrode 280, and the pixel electrode 270. The common electrode 230 is formed on the protective layer 300 using a conductive material such as indium tin oxide, as shown in FIG. 23c.

In the present invention, the common lines are formed parallel to the data lines in the IPS mode of an LCD, so the common signal can be an AC voltage. Therefore, power consumption of the LCD of the present invention is less than that of a conventional LCD in which the common lines have a DC voltage applied to them because the common lines are parallel to the scan lines. The present invention can therefore use the dot inversion method for driving pixels.

Furthermore, the common lines are divided into two groups. One group connects the odd common lines, and the other group connects the even common lines. The common signals applied to the odd common lines and the even common lines are 180 degrees out of phase with each other. Thus, the flicker, which is caused by crosstalk between the common lines and the data lines, is reduced because the common lines are parallel to the data lines, rather than crossing them. Also, no coupling capacitances are formed between the common lines and the data lines.

Consequently, in the IPS mode of the LCD, the present invention further presents advantages of low power consumption and enhanced quality of display in addition to a large viewing angle, which are the advantages of IPS mode.

In the conventional IPS mode, the pixel electrodes are connected in the scan line direction. Thus, it is not possible to apply dot inversion, where the common voltage is an AC voltage. Therefore, the present invention suggests a method for applying a dot inversion driving method in an LCD with an IPS mode, and a method for using an AC voltage in such an LCD using the dot inversion method.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for driving a liquid crystal display device with an in-plane structure mode, comprising the steps of:

applying a scan signal sequentially to a plurality of scan lines;

applying a first data signal to a plurality of odd data lines;

applying a second data signal having reversed polarity relative to the first data signal to a plurality of even data lines;

applying a first common signal to a plurality of odd common lines, wherein the plurality of odd common lines are parallel to the odd data lines; and applying a second common signal to a plurality of even common lines, wherein the plurality of even common lines are parallel to the plurality of even data lines, wherein during the step of applying the first common signal a signal is applied with a same cycle rate as a signal applied in the step of applying the first data signal, and during the step of applying the second common signal a signal is applied with a same cycle rate as a signal applied in the step of applying the second data signal.

2. The method of claim 1, wherein the step of applying the first and second data signals applies AC voltages to the even and odd data lines.

3. The method of claim 2, wherein the steps of applying the first and second common signals applies signals 180 degrees out of phase with each other.

4. The method of claim 1, wherein the steps of applying the first and second common signals applies AC voltages to the plurality of even and odd common lines.

5. The method of claim 1, wherein the steps of applying the first and second common signals applies signals having voltages 180 degrees out of phase with the first and second data signals, respectively.

* * * * *